US 8,555,000 B2

(12) United States Patent
Jo et al.

(10) Patent No.: US 8,555,000 B2
(45) Date of Patent: Oct. 8, 2013

(54) DATA STORAGE DEVICE AND DATA STORING METHOD THEREOF

(75) Inventors: Myung Hyun Jo, Seoul (KR); Sungchul Kim, Hwaseong-si (KR); Jeonguk Kang, Bucheon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 793 days.

(21) Appl. No.: 12/761,488

(22) Filed: Apr. 16, 2010

(65) Prior Publication Data

US 2011/0093659 A1    Apr. 21, 2011

(30) Foreign Application Priority Data

Oct. 16, 2009    (KR) .................. 10-2009-0098610

(51) Int. Cl.
*G06F 12/00* (2006.01)
*G06F 13/00* (2006.01)
*G06F 13/28* (2006.01)

(52) U.S. Cl.
USPC .......................... 711/133; 711/114; 711/103

(58) Field of Classification Search
None
See application file for complete search history.

(56) References Cited

U.S. PATENT DOCUMENTS

| 7,020,751 | B2* | 3/2006 | Kershaw ................. 711/143 |
| 7,496,711 | B2 | 2/2009 | Bartley et al. |
| 7,590,803 | B2* | 9/2009 | Wintergerst ............. 711/134 |
| 7,765,339 | B2* | 7/2010 | Salessi et al. ............ 710/33 |
| 2006/0152981 | A1* | 7/2006 | Ryu ......................... 365/194 |
| 2008/0168465 | A1 | 7/2008 | Tanaka |
| 2008/0276045 | A1 | 11/2008 | Kulkarni et al. |

FOREIGN PATENT DOCUMENTS

| JP | 2008-021314 | 1/2008 |
| JP | 2008-152470 | 7/2008 |
| JP | 2009-521054 | 5/2009 |
| WO | WO 2007/072456 A3 | 6/2007 |

* cited by examiner

*Primary Examiner* — Matthew Bradley
*Assistant Examiner* — Rocio Del Mar Perez-Velez
(74) *Attorney, Agent, or Firm* — Volentine & Whitt, PLLC

(57) ABSTRACT

A data storage device and a data storing method thereof, including first main memories coupled to a plurality of channels, second main memories coupled to the plurality of channels in common, a buffer memory temporarily storing data to be programmed to the first and the second main memories; and a controller configured to program data of victim cache lines from the buffer memory to the second main memories while data of a first victim cache line from the buffer memory is being programmed to the first main memories. The storing method includes that a victim cache line is selected based on cost-based page replacement.

17 Claims, 14 Drawing Sheets

DATA STORAGE DEVICE AND DATA STORING METHOD THEREOF

CROSS-REFERENCE TO RELATED APPLICATION

A claim of priority under 35 U.S.C. §119 is made to Korean Patent Application No. 10-2009-0998610, filed on Oct. 16, 2009, the entire contents of which are herein incorporated by reference.

BACKGROUND

The inventive concepts described herein are generally related to a data storage device, and more particularly to a data storage device including semiconductor memories as a main storage device and a method of storing data thereof.

With the advent of information age, there is an ever-increasing demand for higher data storage capacities and densities in digital data storage devices. Due to increase of this demand, various kinds of personal data storage devices have been developed. Among the many kinds of data storage devices, hard disk drive (HDD) has been widely used in digital processing systems because of high recording density, high data transmission rate, fast data access, and low cost. A HDD includes a platter and complex mechanical components to drive the platter. The HDD has potential disadvantages that its mechanical operation makes it vulnerable to vibration, impact, and mechanical wear/fatigue.

Recently, a semiconductor disk device, which is called a solid state disk (SSD), has been introduced as an alternative to the HDD. The SSD employs semiconductor memories, such as nonvolatile memory devices including flash memories, etc. The SSD does not include the platter and complex mechanical components that are needed in the HDD. Accordingly, compared to the HDD, the SSD can reduce the operating time and latency that are inevitable in operation of the HDD, and consequently enable high speed read and write operations. In addition, the SSD improves reliability of read and write operations because the SSD can avoid errors that could be caused by mechanical operations like friction and wear. Furthermore, the SSD is substantially noiseless and generally does not produce heat. Compared to HDD, the SSD thus has a good reputation as a data storage device suitable for portability.

SUMMARY

In an embodiment of the inventive concept, a data storage device includes first main memories coupled to a plurality of channels; second main memories coupled to the plurality of channels in common; a buffer memory temporarily storing data to be programmed to the first and the second main memories; and a controller configured to program data of victim cache lines from the buffer memory to the second main memories while data of a first victim cache line from the buffer memory is being programmed to the first main memories.

In an example embodiment, the first and the second main memories correspond to respective different ways.

In another example embodiment, the controller directs transfer of the data of a second victim cache line of the victim cache lines to the second main memories through the plurality of channels and programming of the transferred data to the second main memories, after the data of the first victim cache line is transferred to the first main memories through the plurality of channels.

In another example embodiment, the controller directs transfer of data of a third cache line of the victim cache lines to the second main memories through the plurality of channels, after the data of the second victim cache line of the victim cache lines is programmed to the second main memories and if program operation for the data of the first victim cache line is not finished.

In another example embodiment, the controller is configured to direct transfer of data of a fourth victim cache line of the victim cache lines to at least one of the first main memories in which program operation for the data of the first victim cache line is finished, whereby the data of the fourth victim cache line is transferred by page units.

In another example embodiment, while program operation for the data of the first victim cache line is being performed in at least another one of the first main memories, data of the fourth victim cache line is transferred and programmed.

In another example embodiment, the controller is configured to direct that program operation is performed in the first main memories and the second main memories in parallel.

In another example embodiment, the controller selects the first victim cache line and the victim cache lines based on maximum cost of the data temporarily stored in the buffer memory.

In another example embodiment, the maximum cost includes the sum of transfer cost and program cost of the data temporarily stored in the buffer memory.

In another example embodiment, the controller determines the maximum cost when usage of the buffer memory is over a predetermined threshold value.

In another example embodiment, the predetermined threshold value is set in consideration of at least more than one of factors including size of the buffer memory, number of the channels, DMA (Direct Memory Access) time, program type of the first and the second main memories, program time of the first and second main memories, and number of banks in the first and second main memories.

In another example embodiment, the buffer memory includes a plurality of cache lines, each of which includes data of a plurality of pages to be programmed through the plurality of channels. The buffer memory manages data by unit of cache line.

According to another example embodiment, a method of storing data to a data storage device including first main memories and second main memories includes computing cost of data stored in a buffer memory; selecting victim cache lines including a first victim cache line in the buffer memory based on maximum cost of the computed cost; scheduling timing for data of the victim cache lines to be programmed to the first main memories and the second main memories through a plurality of channels; and programming, in response to the result of the scheduling, data of at least more than two of victim cache lines from the buffer memory to the second main memories while data of the first victim cache line from the buffer memory is being programmed to the first main memories.

In another example embodiment, the maximum cost is computed when usage of the buffer memory is over a predetermined threshold value.

In another example embodiment, programming includes transferring and programming data of the first victim cache line from the buffer memory to the first main memories through the plurality of channels; and after the data of the first victim cache line is transferred to the first main memories, transferring and programming data of a second victim cache line of the victim cache lines to the second main memories through the plurality of channels.

In another example embodiment, programming further includes, after the data of the second victim cache line of the victim cache lines is programmed to the second main memories and if program operation for the data of the first victim cache line is not finished, transferring and programming a third victim cache line of the victim cache lines to the second main memories through the plurality of channels.

In another example embodiment, programming further includes transferring data of a fourth victim cache line of the victim cache lines of the buffer memory to at least one of the first main memories by unit of page in which program operation for the data of the first victim cache line is finished.

In another example embodiment, transferring data of the fourth victim cache line occurs while program operation for the data of the first victim cache line is being performed.

According to another example embodiment, a computing system includes a host; and a data storage device storing data in response to an inputted write command from the host, the data storage device including first main memories coupled to a plurality of channels, second main memories coupled to the plurality of channels in common, a buffer memory temporarily storing data to be programmed to the first and the second main memories, and a controller configured to program data of victim cache lines from the buffer memory to the second main memories while data of a first victim cache line from the buffer memory is being programmed to the first main memories.

BRIEF DESCRIPTION OF THE DRAWINGS

The accompanying drawings are included to provide a further understanding of the embodiments of the inventive concept, and are incorporated in and constitute a part of this specification. It should be understood that various aspects of the drawings may have been exaggerated for clarity. Example embodiments of the inventive concept will be described in further detail below with reference to the accompanying drawings in which.

DETAILED DESCRIPTION OF THE EMBODIMENTS

Example embodiments will now be described more fully with reference to the accompanying drawings. The example embodiments may, however, be embodied in many different forms and should not be construed as being limited to the embodiments set forth herein; rather, these embodiments are provided so that this disclosure will be thorough and complete, and will fully convey the concept of example embodiments to those of ordinary skill in the art.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" or "to/from" includes any and all combinations of one or more of the associated listed items.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
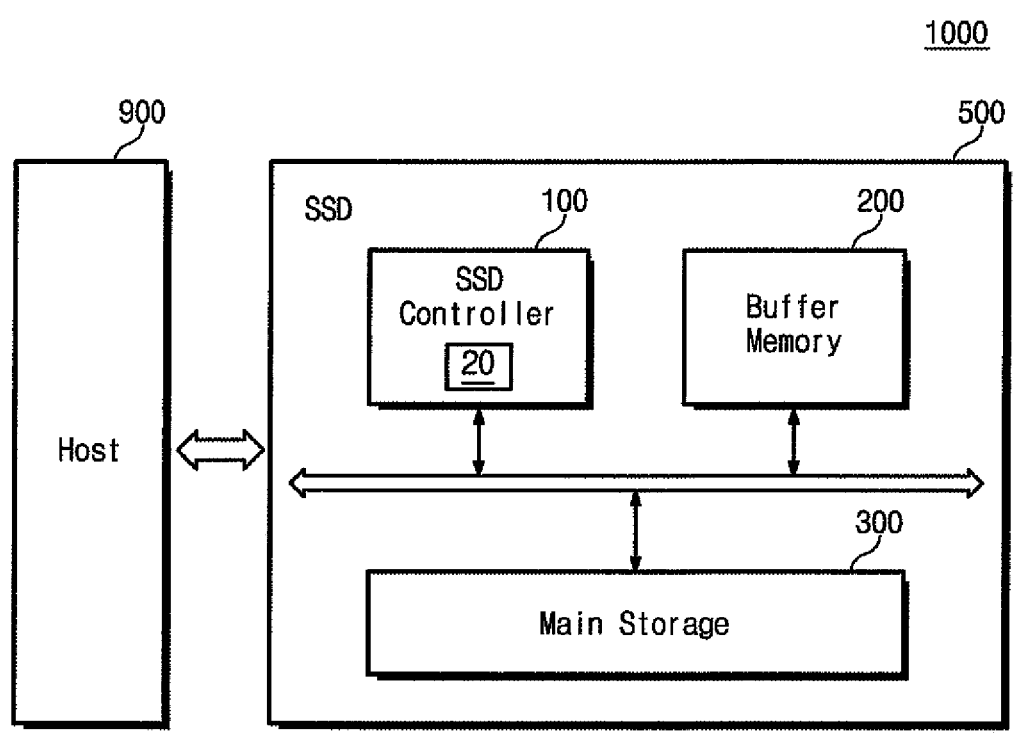
FIG. 1 is an exemplary block diagram showing a data storage device of a memory system according to an example embodiment of the inventive concept.

FIG. 1 is a block diagram showing a data storage device of a memory system according to an example embodiment of the inventive concept. Referring to FIG. 1, the memory system 1000 includes a data storage device such as a SSD 500 and a host 900. The SSD 500 comprises a SSD controller 100, a buffer memory 200, and a main storage 300.

The main storage 300 is used as a main storage device for storing a large amount of data. The main storage 300 may use semiconductor memories instead of a platter of a hard disk drive HDD. The semiconductor memories may constitute either nonvolatile memories or volatile memories. There are many channels (e.g. N number) between the SSD controller 100 and the main storage 300, each of which may have a plurality of ways (e.g. M number). Detailed construction of channels and ways will be described later.

In one example, it will be exemplified that the main storage 300 is constructed by flash memories (nonvolatile memories). However, the memory that may be applicable to the main storage 300 is not limited to a particular type and a particular form but may be constructed by various types. For example, the memory applicable to the main storage 300 may include any type of nonvolatile memory such as MRAM, PRAM as well as flash memory. In addition, DRAM can be applicable to the main storage 300. The main storage 300 may also comprise a mixed construction that includes at least one of nonvolatile memories and at least one of volatile memories, or at least more than two types of nonvolatile memories.

Furthermore, the number of data bits stored in each memory cell of the memories of the main storage 300 may be also various. For example, flash memory can store 1-bit or 2 or more bits per memory cell. The memory cell that can store 1-bit is called a single-bit cell and the memory cell that can store 2 or more bits is called a multi-bit cell, a multi-level cell, or a multi-state cell. In the case of the multi-level cell, the program time can be varied according to the write order between LSB(Least Significant Bit) and MSB(Most Significant Bit).

A memory cell structure included in flash memories may be various types. For example, a flash memory may be constructed by at least one of NAND flash memory, NOR flash memory, and ONE-NAND® flash memory that is a single chip having a flash memory core and a memory controller. Also, flash memories may be a hybrid type that is mixed with at least two different types of flash memories.

A charge storage element in a memory cell of flash memory may be various types, which include a floating gate, a layer with a charge trap site such as $Si_3N_4$, $Al_2O_3$, HfAlO. In particular, a flash memory which uses a charge trap layer as a charge storage element is often called a charge trap flash CTF. The program time of flash memory can be varied according to the memory cell structure or the charge storage element.

The buffer memory 200 temporarily stores data that is transferred between the SSD controller 100 and the host 900, and that is transferred between the SSD controller 100 and the main storage 300. The SSD controller 100 may include a buffer memory control element to control data input and data output in the buffer memory 200. This means that data transfer to/from the buffer memory 200 is controlled by the SSD controller 100. The buffer memory 200 can be outside the SSD controller 100, as shown in FIG. 1, or inside the SSD controller 100. The buffer memory 200 may be constructed by a random accessible memory like DRAM or SRAM. In this example, the buffer memory 200 is constructed by DRAM.

The buffer memory 200 can manage data by the unit of cache line. Each cache line may include a plurality of sectors. A cache line may store the amount of data of a plurality of pages (e.g. N pages) to be stored to the main storage 300 through the plurality of channels (e.g. N number). As will be described below, data that can be stored into a single cache line is defined as a super-page. Detailed construction of the buffer memory 200 will be explained below with reference to FIG. 4.

According to a method of managing data for the buffer memory 200 in accordance with an example embodiment of the inventive concept, data of a plurality of pages to be programmed through the plurality of channels can be managed by the cache line in a lump. Thus, the time needed to access a plurality of sectors in which data is stored can be reduced considerably, so that data management on the buffer memory 200 becomes more effective.

In addition, the buffer memory 200 according to an example embodiment of the inventive concept can be constructed and managed by a method that is related to a cost-based page replacement. Through the method of cost-based page replacement, a victim cache line or victim pages of the buffer memory 200 can be selected based on maximum cost of each cache line or each page. The size of the victim cache line can be varied. For example, the size of the victim cache line may be a super-page of a plurality of pages (e.g. N pages), one or more pages, or one or more sectors. Data of the selected victim cache line can be transferred to a plurality of flash memories through the plurality of channels. That is, data of the selected victim cache line can be programmed into the plurality of flash memories in the main storage 300 through the plurality of channels. If data transfer does not exist on the channels and although a program operation previously performed is not finished yet, it can be scheduled to operate a program operation for another victim cache line. According to a scheduling method like this, it can be possible to perform program operations for at least more than two victim cache lines through the plurality of channels used in common. In this example, at least two programs can be executed in at least more than two ways in at least one channel in parallel.

The SSD controller 100 controls write/read operation to/from the buffer memory 200 and the main storage 300 in response to an inputted command from the host 900. The SSD controller 100 can control overall operations of the SSD. As will be described below, the SSD controller 100 according to an example embodiment of the inventive concept helps to store data to the buffer memory 200 without bottlenecks in order to maximize efficiency of re-usage of the buffer memory 200. For this, the SSD controller 100 according to an example embodiment of the inventive concept uses a method of setting a victim page or a victim cache line and a method of scheduling program operation explained above. The method of setting a victim page and the method of scheduling can be executed by control of a data cache layer (shown in FIG. 5) loaded on the SSD controller 100. The data cache layer may be stored inside the SSD controller 100 (e.g. code region of an internal memory shown in FIG. 2) as a type of firmware or software. In an exemplary embodiment, the data cache layer loaded in the SSD controller 100 as a type of firmware will be explained. However, the data cache layer may be constructed by a micro-program or by hardware. Also, the SSD controller 100 may include various firmware as well as the data cache layer, which will be described in detail below with reference to FIG. 5.

Figure 2:
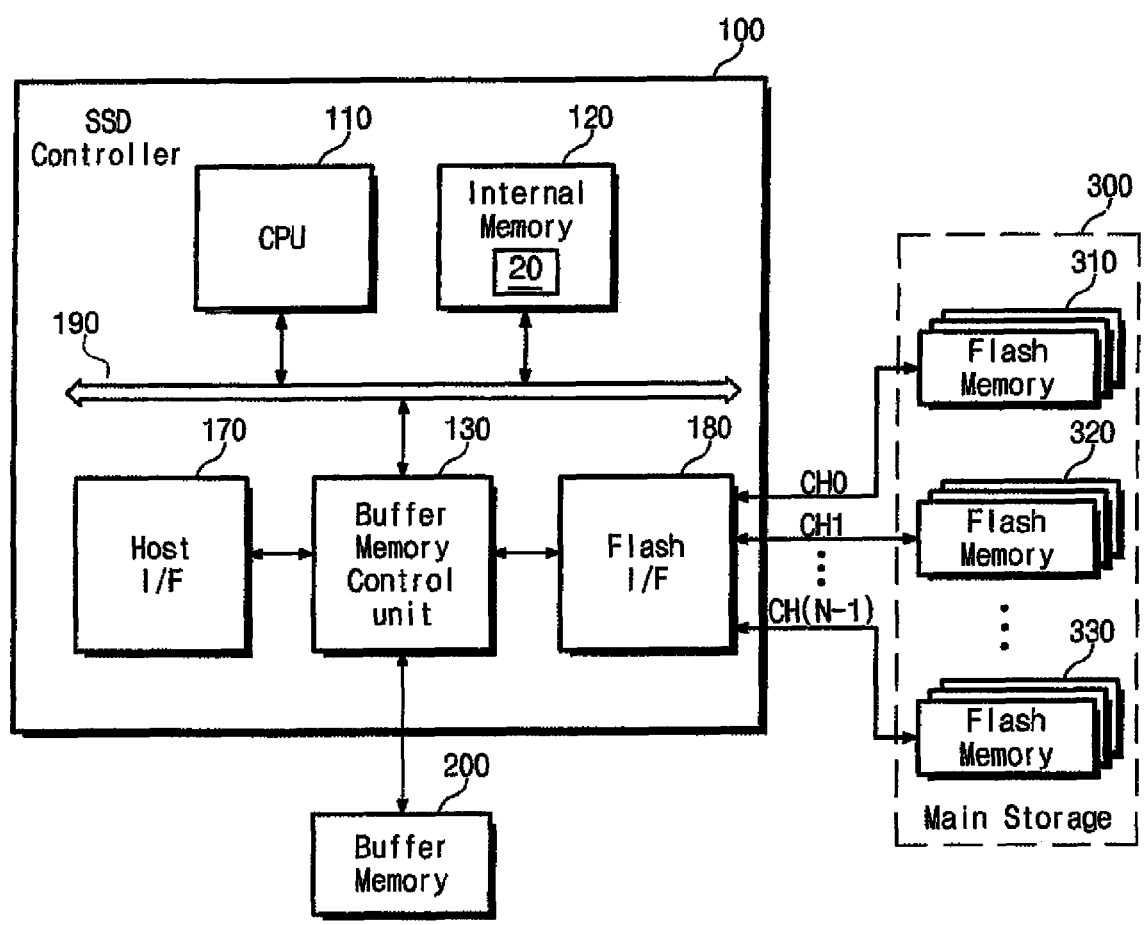
FIG. 2 shows an exemplary detail construction of a SSD and a SSD controller illustrated in FIG. 1.

FIG. 2 is a block diagram showing a detailed structure of the SSD 500 and the SSD controller 100 illustrated in FIG. 1, according to an example embodiment of the inventive concept. Referring to FIG. 2, the SSD controller 100 includes a central processing unit CPU 110, an internal memory 120, a buffer memory control unit 130, a host interface 170, a flash interface 180 and a CPU bus 190, all of which are electrically coupled to one another through the CPU bus.

The CPU 110 controls overall operations of the SSD 500. One or more CPUs may be inside the SSD controller 100. When one CPU is in the SSD controller 100, it is called a single core processor. When more than one CPU is in the SSD controller 100, it is called a multi core processor. The CPU 110, the internal memory 120, and the buffer memory control unit 130 form a control circuit, which can be made by a single chip based on System-On-Chip SoC technology.

Operation of the SSD controller 100 comprising the CPU 110, the internal memory 120, and the buffer memory control unit 130 is controlled by a firmware loaded inside the SSD controller 100. Additional information (e.g. mapping information, etc) executed by the firmware is stored into a data region in the internal memory 120 or into the main storage 300. The internal memory 120 may be either inside or outside the SSD controller 100. In FIG. 2, a data cache layer 20 among firmware loaded on the SSD controller 100 is shown as an example. Logically hierarchical structure and function of firmware loaded on the SSD controller 100 will be described in detail with reference to FIG. 5.

The host interface 170 exchanges commands, addresses, and data with the host 900 under control of the CPU 110. The host interface 170 can support one or more interface protocols, such as USB (Universal Serial Bus), MMC (Multi Media Card), PCI-E (PCI Express), ATA (AT Attachment), SATA (Serial AT Attachment), PATA (Parallel AT Attachment), SCSI (Small Computer System Interface), SAS (Serial Attached SCSI), ESD (Enhanced Small Disk Interface), and IDE (Integrated Drive Electronics).

The buffer memory control unit 130 controls write/read/erase operations of the internal memory 120 and the buffer memory 200 under control of the CPU 110. The flash interface 180 exchanges data through a plurality of channels between the internal memory 120 and/or the buffer memory 200 and the main storage 300, and between the internal memory 120 and the buffer memory 200. If a read command from the host 900 is inputted into the SSD controller 100, read data from the main storage 300 may be stored temporarily in the buffer memory 200 through the flash interface 180 and the buffer memory control unit 130. The read data stored in the buffer memory 200 may be outputted to the host 900 through the buffer memory control unit 130 and the host interface 170.

A write command inputted from the host 900 may be executed in two steps. A first step is that write data inputted through the host interface 170 is stored temporarily in the buffer memory 200 through the buffer memory control unit 130. A second step is that write data stored in the buffer memory 200 is programmed into the main storage 300 through the buffer memory control unit 130 and the flash interface 180. In an exemplary embodiment, the first step is called a buffer memory write operation and the second step is called a NPJ (NAND Program Job), which may be called a flash write operation or flash program operation. A NPJ according to an example embodiment of the inventive concept may be performed in parallel through the plurality of channels CH0~CHn-1 coupled to the main storage 300.

A temporary storage function for read/write data may be done by using a data region of the internal memory 120 as well as the buffer memory 200. As the size of read/write data gets larger, the temporary storage function for read/write data will be done in the buffer memory 200 rather than the internal memory 120. In this exemplary embodiment, a case that the temporary storage function is done by using the buffer memory 200 will be explained. However, the method of storing data to the buffer memory 200 according to an example embodiment of the inventive concept can be applicable to the internal memory 120 and to a memory that may correspond to the internal memory 120.

In an exemplary embodiment, the CPU 110 supplies the host 900 with a signal that indicates the end of a write command soon after finishing the buffer memory write operation while the write command is being preformed. Also, the CPU 110 may schedule a NPJ not performed yet to be performed internally in the SSD 500 at a proper time when the CPU 110 is not busy.

As will be explained in detail below, according to a method of scheduling a NPJ in accordance with an example embodiment of the inventive concept, at least a portion of a period of program operations of the main storage 300 comprising non-volatile memories such as flash memories can be performed simultaneously or in parallel in at least more than two ways that are common to the plurality of channels. As a result, usage of the plurality of channels of the main storage 300 will be maximized and performance fluctuation will be minimized by not overlapping write operations to a same bank of the main storage 300, all of which improve write performance of the SSD 500.

Figure 3:
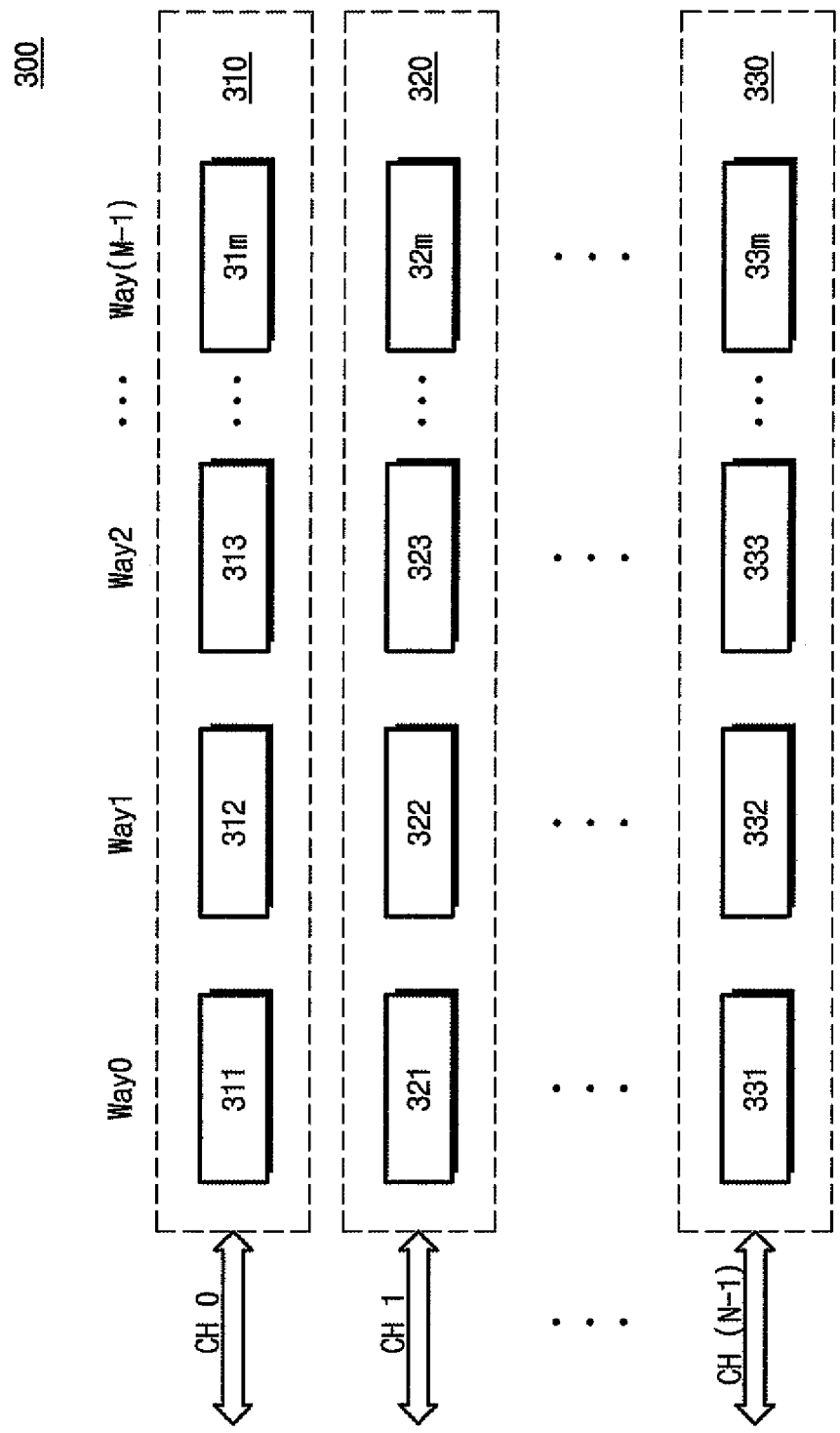
FIG. 3 shows an exemplary construction of channels and ways of a main storage illustrated in FIG. 1.

FIG. 3 shows a structure of the plurality of channels and ways illustrated in FIG. 2 according to an example embodiment of the inventive concept. Referring to FIG. 3, a plurality of flash memory devices 311~31m, 321~32m, 331~33m are electrically coupled to corresponding ones of the plurality of channels CH0~CH (N-1) between the SSD controller 100 and the main storage 300. Each channel may mean an independent bus which can communicate commands and data with corresponding ones of the flash memories. The flash memories 310, 320 and 330 are connected to a plurality of ways Way0~Way(M-1) (e.g. M number). The total M number of flash memories may comprise M number of ways of each channel.

For example, flash memories of reference number 310 comprises M number of ways from Way0 to Way (M-1) in channel 0 CH0, in which each flash memory is connected to a corresponding one of ways Way0~Way (M-1). Such a connecting relation between each channel, each way and flash memories is also applicable for flash memories of reference number 320 and 330.

A way is a unit to divide flash memories which are in a common channel, so that, according to the number of the channel and the number of the way, each flash memory may be identified. For instance, Way1 of channel CH0 denotes a flash memory of reference number 312. Way2 of channel CH1 denotes a flash memory of reference number 323. Whether a command supplied from the host 900 is performed at which way of which channel may be determined by a logical block address LBA transferred from the host 900. That is, each flash memory making up the main storage 300 can be managed according to information of corresponding channel and way.

Data to be programmed or read to/from each of flash memories is stored temporarily in the buffer memory 200, which may be comprised of DRAM or SRAM. The buffer memory 200 may operate using write-back, by which a certain amount of data is filled in the buffer memory 200 and then data stored in the buffer memory 200 can be programmed to the main storage 300.

Though the host 900 provides the buffer memory 200 with a successive logical address LBA, the address indicating where data to be stored actually may be discontinuous. The reason why the buffer memory 200 is provided with non-successive addresses from the CPU 110 is because a processor like the CPU 110 operates using multiple processes or threads. Thus, writing data with successive addresses provided from the host 900 may be written discontinuously in the buffer memory 200. Discontinuous write operations like this may increase the probability of access to a bank of the buffer memory 200 in which a write operation is not finished yet, so that it leads to decreased speed of data storage of the SSD 500.

To prevent this problem in an example embodiment of the inventive concept, a maximum cost comprising the sum of data transfer cost and program cost about each page is used to control a write operation and a page replacement operation. The write operation and the page replacement operation in this example may be performed by a data cache layer DCL (shown in FIG. 5) of firmware loaded on the SSD controller 100.

In one exemplary embodiment, if the amount of use of the buffer memory 200 is over a certain critical value, the maximum cost will be calculated by the data cache layer DCL and a page within the calculated maximum cost will be selected as a victim cache line. In another exemplary embodiment, a victim cache line may be determined by comparing the maximum costs of the plurality of pages. For example, the victim cache line may be decided from the order that the calculated maximum cost is big or that the calculated maximum cost is small. In addition, the victim cache line may be determined by way of selecting alternately between a large value of maximum cost and a small value of maximum cost. That is, the method of determining the victim cache line using maximum cost may be implemented by various ways.

Data of a selected victim cache line will be programmed in parallel to the plurality of flash memories in the main storage 300 through the plurality of channels. In performing this program, after completing data transfer on the plurality of channels or a data write operation on one of the plurality of channels, data of another victim cache line can be programmed to the main storage 300. A NPJ to be performed later can use the same cache line that a previous performed NPJ used, or may use a different way than the previous performed NPJ used. At this time, at least a portion of the period of program operations that is performed in different ways may be overlapped with each other in time. In this case, at least two program operations can be performed in at least more than 2 ways in at least one channel.

Figure 4:
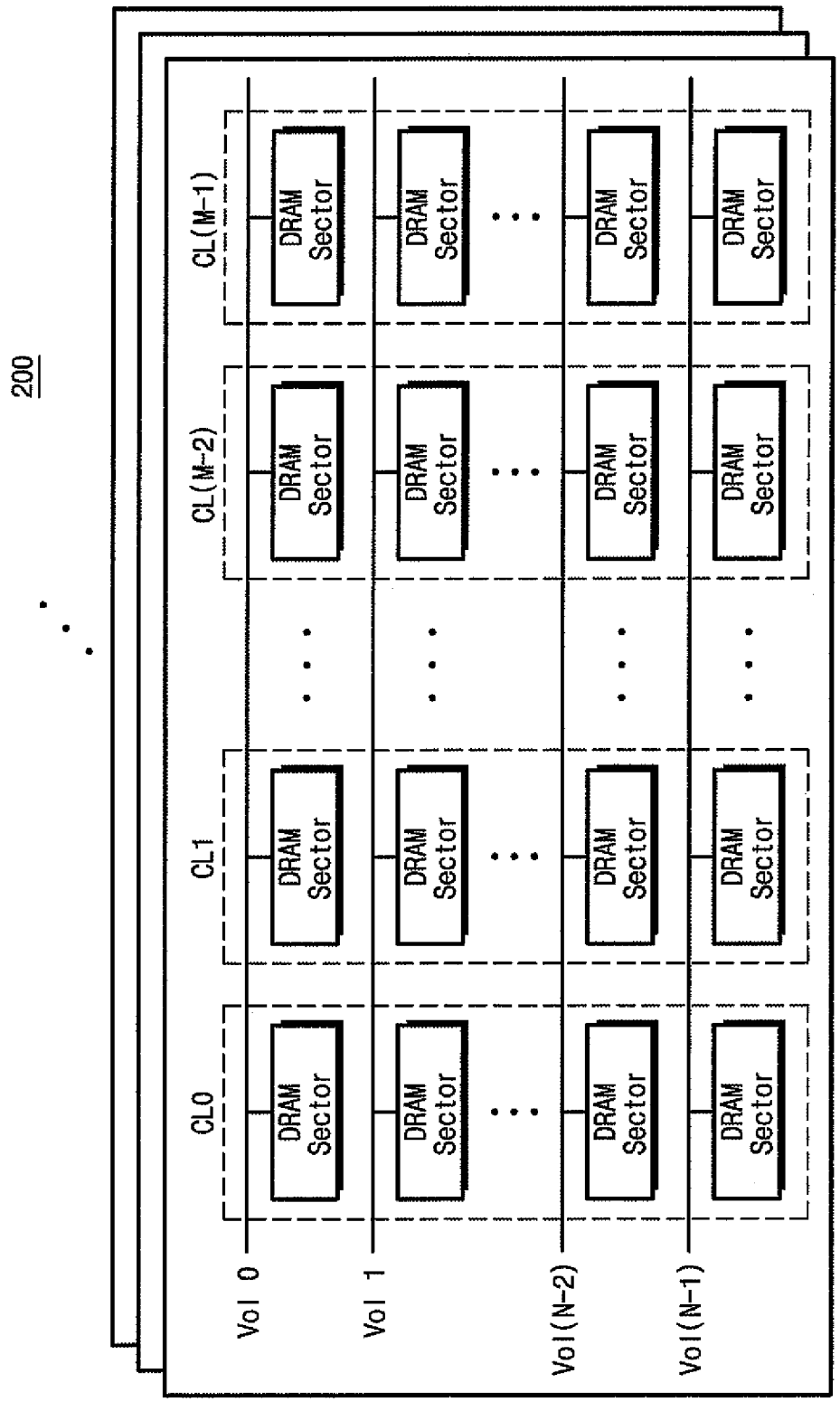
FIG. 4 shows an exemplary physical construction of a buffer memory.

FIG. 4 shows a physical construction of the buffer memory 200 according to an example embodiment of the inventive concept. Referring to FIG. 4, the buffer memory 200 comprises a plurality of sectors which are arranged at intersections of columns and rows. In an exemplary embodiment, one sector can store one page data. However, this is only an exemplary embodiment, so the number of pages that can be stored in one sector is not limited to a certain number but is variable.

The columns of the buffer memory 200 are defined as volumes, each of which corresponds to each of the channels of the main storage 300. The rows of the buffer memory 200 are defined as cache lines, each of which corresponds to each of the ways of the main storage 300 and includes a plurality of sectors. For example, in case that the main storage 300 includes N channels, one cache line that corresponds to one way in the N channels can store data of a plurality of pages. The number of cache lines (e.g. M) and the number of volumes (e.g. N) is not limited to a certain number but is variable according to various embodiments. In the exemplary embodiment, the buffer memory 200 can manage data by unit of cache line. The buffer memory 200 provides data stored in one cache line to the plurality of flash memories that corresponds to one way in the N channels, so that data can be programmed into the plurality of flash memories at the same time and in parallel.

In an exemplary embodiment of the inventive concept, one super-page is stored to one cache line and is programmed into corresponding flash memories for each NPJ. However, data size performed in one NPJ is not limited to only one super-page. For example, a smaller page (e.g. one or more page) than the super-page can be programmed for each NPJ. That is, the size of data performed for each NPJ can be changeable according to various embodiments.

Figure 5:
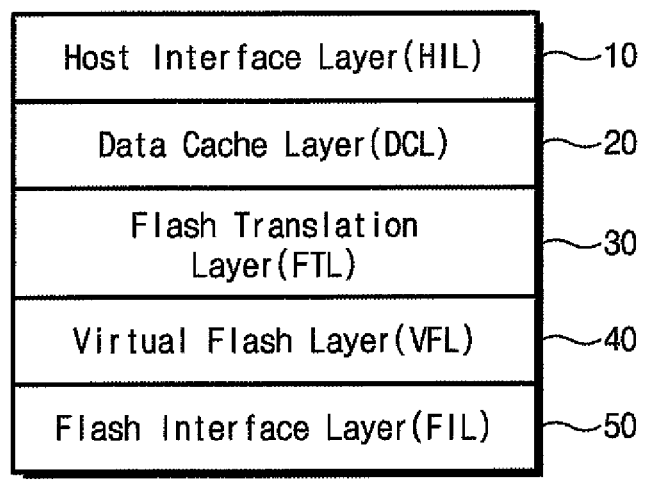
FIG. 5 shows an exemplary structure of logical hierarchy mounted on a SSD controller.

FIG. 5 shows a logically hierarchical structure of a firmware loaded in the SSD controller 100 in accordance with an example embodiment of the inventive concept. Referring to FIG. 5, the firmware loaded on the SSD controller 100 includes a host interface layer HIL 10, a data cache layer DCL 20, a flash translation layer FTL 30, a virtual flash layer VFL 40 and a flash interface layer FIL 50.

Hereinafter, the functions of the firmware loaded in the SSD controller 100 will be described with reference to FIG. 1 to FIG. 5. The HIL 10 controls interface operations occurring between the host 900 and the host interface 170. A program or a firmware that functions the same as the HIL 10 may be also stored in the internal memory 120 of the SSD 500 in FIG. 2, in order to be used to control operation of the host interface 170, and loaded on the host interface 170 directly. The HIL 10 decodes an inputted command from the host 900 through the host interface 170 like SATA or SAS, and stores the decoded information in an interface register (not shown). The HIL 10 receives the decoded information stored in the interface register by way of polling or interruption and determines if the inputted command is proper to a protocol or not.

The DCL 20 functions to control a read/write operation that is performed in the buffer memory control unit 130 to the internal memory 120 and/or the buffer memory 200. A software or a firmware, in which the function of the DCL 20 is programmed, may be stored in the internal memory 120 to control the operation of the buffer memory control unit 130, or may be loaded in the buffer memory control unit 130 directly.

The DCL 20 manages data to be stored in the buffer memory 200 based on the structure of way and channel of the flash memories 310 to 330 in the main storage 300. For example, the DCL 20 can control read/write operation of the buffer memory 200 based on the maximum cost. In an exemplary embodiment, the maximum cost is used to select a victim cache line of the buffer memory 200. The victim cache line may mean a page to read data that will be programmed into the flash memories from the buffer memory 200, for performing NPJ operation.

Moreover, the DCL 20 according to an example embodiment of the inventive concept may schedule execution timing of a NPJ when data of a selected victim cache line is programmed into flash memories of the main storage 300 through the plurality of channels. Specifically, the DCL 20 according to an example embodiment of the inventive concept may schedule a NPJ execution timing to minimize an idle time of channel and way without any conflict between a previously performed NPJ and a NPJ to be performed presently. The NPJ execution timing may be determined by considering at least more than one of the factors including size of the buffer memory 200, the number of channels, direct memory access time tDMA, program type of flash memories (e.g. LSB program or MSB program), program time of flash memories tPROG, and the number of banks.

According to the NPJ scheduling operation of an exemplary embodiment of the inventive concept, even though a NPJ that is performing is not finished in all channels, once idle states occur, that is there is no data on the plurality of channels, a next NPJ is scheduled to be able to be performed. For example, after data to be programmed to the flash memories through the plurality of channels is inputted to page buffers in each of the flash memories, the next NPJ can be performed before the program operation for the present NPJ is not completed. As a result, at least two programs can be performed in respective different ways that are included in a same channel. At this time, at least a portion of a period of program operations to be performed in the respective different ways may be operated at the same time.

The FTL 30, in response to the result of scheduling of the DCL 20, may map from a logical page number LPN into a physical block address PBA of each flash memory. According to the result of mapping of the PBA, data will be programmed into a corresponding location in each flash memory.

The flash memories in the main storage 300 can not support an overwrite operation. Also, the data unit of a program operation of the flash memories is different than the data unit of an erase operation. For example, the data unit of program operation is a page size, but the data unit of an erase operation is a block size that is bigger than the page size. Generally, one block includes a plurality of pages. Also, frequent erase operations may decrease the life span of the flash memories. Accordingly, the FTL 30 can be used to designate memory cells to be programmed among erased memory cells to minimize the number of erase operations.

The FTL 30 converts the logical block address LBA supplied from the host 900 into a logical page number LPN, which is converted into physical block address PBA of flash memories during program operation, which is called an address mapping operation. Address mapping information of flash memories may be stored in any region (e.g. meta region) of flash memories 310 to 330. The stored address mapping information is loaded into the internal memory 120 or the buffer memory 200.

In addition, the FTL 30 functions to provide management of a bad block, management of data conserving when power is removed unexpectedly, and management of wear leveling, etc. The management of a bad block may include management of information of the bad block and is operated in the VFL 40 instead of in the FTL 30.

The FIL 50 functions to control interface operation performed between the flash interface 180 and the flash memories of the main storage 300. A software or a firmware in which the function of the FIL 50 is programmed may be stored in the internal memory 120 to control the operation of the flash interface 180. Also it may be loaded in the flash interface 180 directly.

Figure 6:
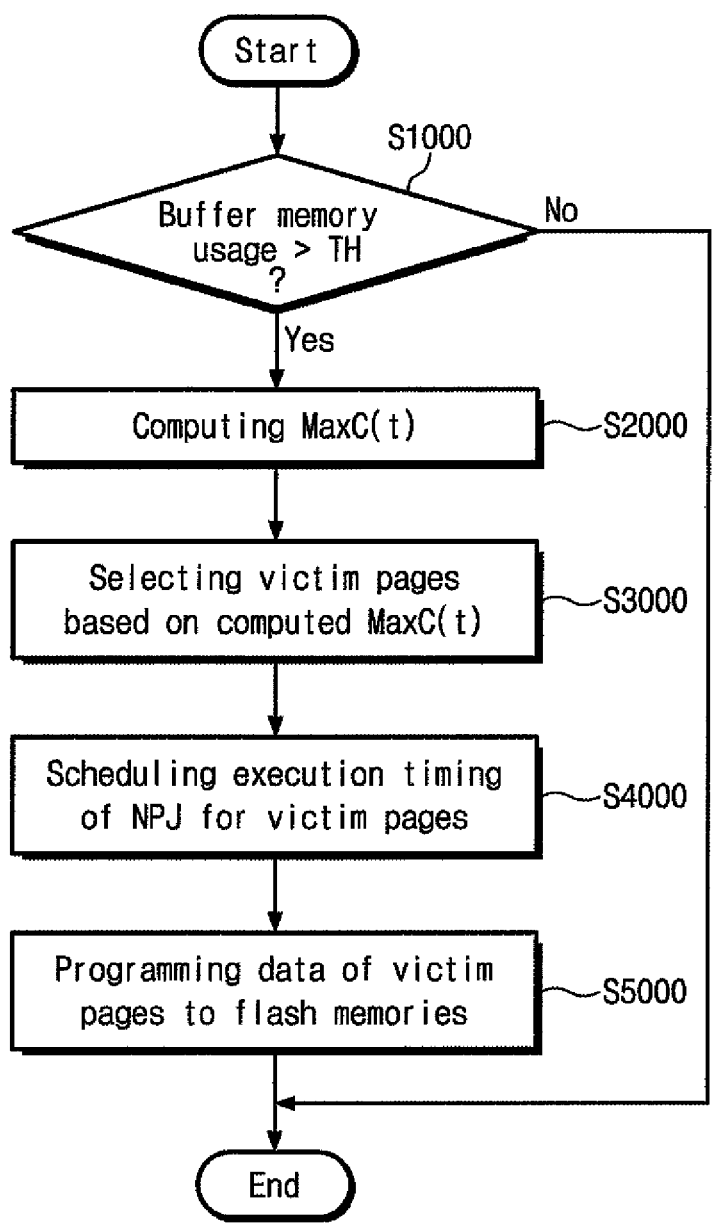
FIG. 6 is a flow chart showing a method of selecting a victim cache line.

FIG. 6 is a flowchart showing a method of selecting a victim cache line according to an example embodiment of the inventive concept. Referring to FIG. 6, first, whether buffer memory usage is over a predetermined predetermined threshold value TH or not is judged in step S1000. According to the result of judgment, if the buffer memory usage is over the TH, maximum cost MaxC(t) on each page or super-page is computed in step S2000.

The operating characteristics of flash memories of the main storage 300 is changeable according to the number of channels, direct memory access time tDMA, program type of flash memories (e.g. LSB program or MSB program), and program time of flash memories tPROG, and the number of banks. For example, in case where 16 Kb data of a super-page is to be stored in the flash memories, 4 μs is used for data transfer between the host 900 and the buffer memory 200, and 1 ms is used for data transfer between the buffer memory 200 and the flash memories of the main storage 300 and for program operation of the flash memories. In this case, the buffer memory 200 should have at least 250 entries to interface data with no bottleneck between the host 900 and the buffer memory 200. The number of entries is calculated on the basis of one bank under the condition of ignoring transfer time of internal tDMA. If the number of banks that can be used for data transfer is 8, the number of entries required in the buffer memory 200 is decreased by one eighth. In addition to this, additional overhead of software/hardware should be considered when the number of banks is increased.

Figure 7:
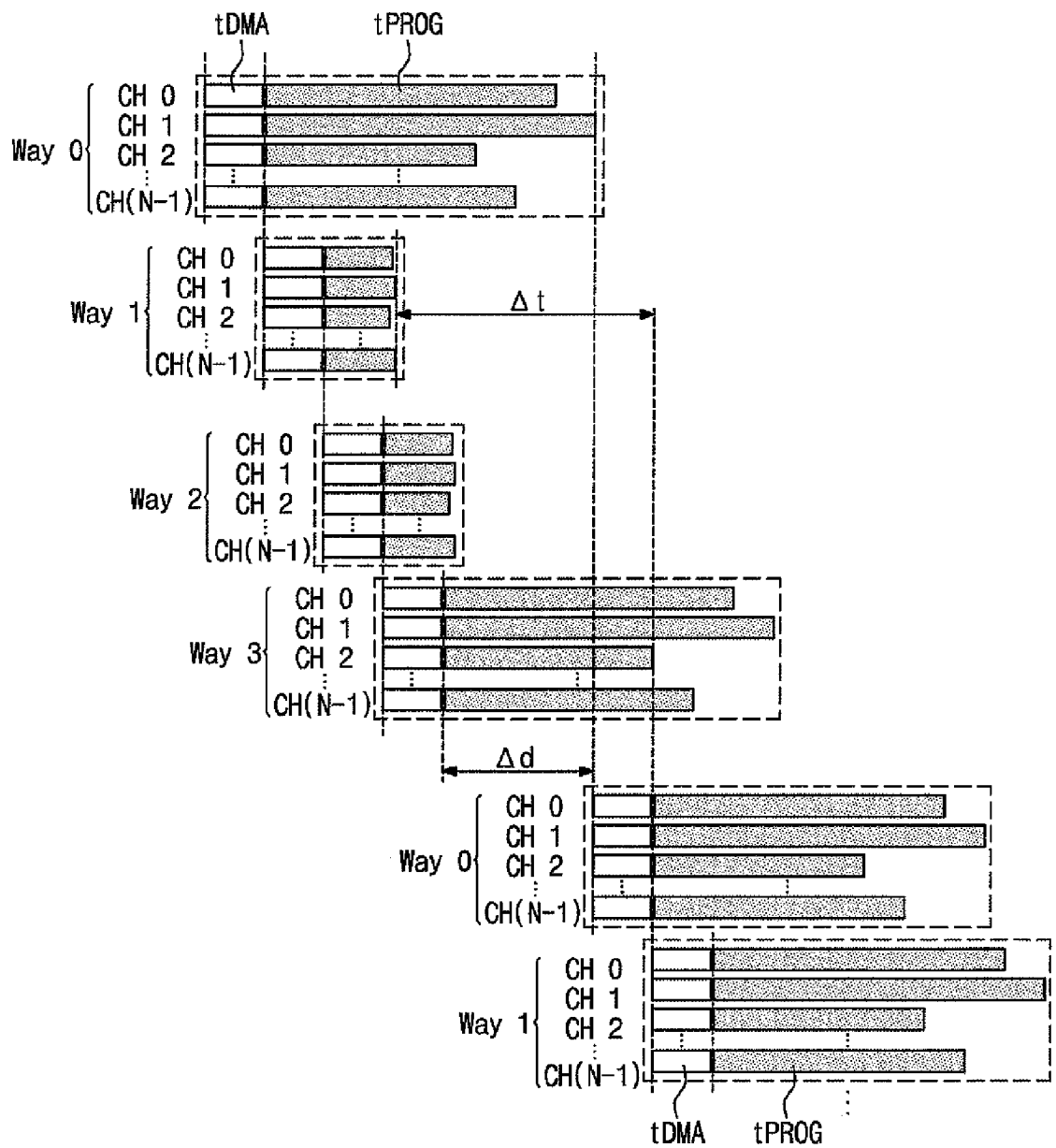
FIG. 7 illustrates a method of setting a threshold value used in step S100 in FIG. 6.

FIG. 7 is a timing diagram to explain the reason why a setting step of the threshold value TH in the step S1000 illustrated in FIG. 6 is needed when a cost-based page replacement technique according to the inventive concept is not adapted.

In FIG. 7, it is exemplified that the buffer memory 200 has 8 cache lines and 4 banks that are able to be used for data transfer (e.g. in case that the main storage 300 includes 4 ways). For example, in case that tDMA for cache line CL0 and CL3 is 100 μs and tPROG of the flash memories of the main storage 300 is 1.5 ms, the total time during which data in the cache line CL0 and CL3 is programmed into the flash memories of the main storage 300 can be defined as 1.6 ms (100 μs+1.5 ms). Also, in case that tDMA for cache line CL1 and CL2 is 100 μs and tPROG of the flash memories of the main storage 300 is 400 μs, the total time during which data in the cache line CL1 and CL2 is programmed into the flash memories of the main storage 300 can be defined as 500 μs (100 μs+400 μs). Here, tDMA is a time for data transfer from the buffer memory 200 to the main storage 300, and tPROG is a time for programming data transferred to the main storage 300 into the flash memories of the main storage 300. The total time required for programming data of each cache line may be defined by the program time of a page that is programmed latest among many pages that constitute each cache line. Once data of the selected cache line is started to be programmed to the main storage 300, the selected cache line is locked in a non read/write state for the purpose of data conserving for 500 μs or 1.6 ms.

In the case where program operation to the main storage 300 is started from the cache line CL0 when all cache lines of the buffer memory 200 are full of data, data of the cache line CL0 can be transferred and programmed to the Way0. When tDMA of the Way0 is passed, data of cache line CL1 can be transferred and programmed to Way1 of the main storage 300. When tDMA of the Way1 is passed, data of cache line CL2 can be transferred and programmed to Way2 of the main storage 300. In the same manner, when tDMA of the Way2 is passed, data of cache line CL3 can be transferred and programmed to Way3 of the main storage 300.

After that, because the number of available banks or ways in the main storage 300 is 4, data of cache line CL4 will be transferred and programmed to the Way0. However, when tDMA of the Way3 is passed, data of the CL4 can not be transferred and programmed to the Way0 because tPROG of Way0 is not yet finished. Thus, data of the CL4 is transferred to the Way0 after the program operation being performed on the Way0 is finished. Accordingly, the time when data of the CL4 can be transferred to the Way0 is after a delay time Δd from after tDMA of the Way3 is passed.

Meanwhile, as shown in FIG. 7, the required program time of the Way1 and the Way2 is much shorter than the required program time of the Way0 and the Way3. Nonetheless, in the case of FIG. 7 in which cost-based page replacement according to the inventive concept is not adapted, the Way1 and the Way2 have to be kept in a locked state without any operation during a waiting time Δt until a next operation begins.

To prevent the delay time Δd and the waiting time Δt from occurring, a cost-based page replacement according to one example of the inventive concept can be adapted, which uses the threshold value TH that is set based on buffer memory usage. In an exemplary embodiment, for the case of FIG. 7, the threshold value TH can be set in order to apply the cost-based page replacement from the program operation for the cache line CL2.

According to an embodiment of the inventive concept, the delay time Δd and the waiting time Δt can be minimized and the usage of channels of the main storage 300 can be also maximized. The method of setting the TH as explained above is only one example. So, size of the buffer memory 200, the number of channels, tDMA, the program type of flash memories, tPROG, and the number of banks as well as the usage of the buffer memory 200 can be considered for setting the TH.

Referring to FIG. 6 again, maximum cost MaxC(t) can comprise the sum of page transfer cost T(t) and program cost P(t) on each page or super-page. In this exemplary embodiment, the transfer cost T(t) can be varied by tDMA, the number of IOs or the number of channels. tDMA is defined by the number of clocks to be counted. The program cost P(t) is defined by the required time for data of page or super-page to be programmed to corresponding flash memories. The program cost P(t) can be varied by program type to be performed (e.g. LSB program or MSB program) and characteristics of memory cells of flash memories (e.g. FN51, FN42, FN35, etc). For example, in MLC NAND flash memories, the program cost P(t) of MSB program (e.g. 1.6 ms) becomes greater than that of LSB program (e.g. 400 μs). Whether a present NPJ to be performed is for MSB program or LSB program may be determined according to a logical page number LPN of the corresponding NPJ. In the case that a memory cell is deteriorated by frequent erase operations and stress, the number of program fails is increased during a program verifying operation, so that program time also gets increased.

The maximum cost MaxC(t) may be defined by the property of hardware of flash memories statistically as explained above. Also, the maximum cost MaxC(t) can be dynamically defined by a previous maximum cost MaxC(t) and a wait cost W(t). For example, if the wait time W(t−1) during performing a NPJ for the selected cache line according to the previous maximum cost MaxC(t) happens, a present wait time W(t) may be set to MaxC(t−1)−W(t−1) in order for W(t) not to happen after the present NPJ to be performed. In this exemplary embodiment, the present MaxC(t) comprises data transfer cost (e.g. 100 μs) and program cost (e.g. 400 μs). When a present NPJ is performed, at a time NPJ(t), the wait cost W(t) occurs if there is a previous NPJ that is not finished at the same bank as the present NPJ is performed. For this, the next maximum cost MaxC(t+1) will consider W(t) that is occurs in a previous NPJ.

After the maximum cost MaxC(t) about each page or each super-page is computed in step S2000, a page or a super-page having maximum cost based on the computed MaxC(t) is selected as a victim cache line in step S3000. The selected cache line in step S3000 may be plural. Computation of MaxC(t) and selection of the victim cache line may be executed under control of the data cache layer DCL 20 in the SSD controller 100. The size of the selected cache line may be a super-page corresponding to a bank or one or more pages. That is, the size of the victim cache line may be varied. In an exemplary embodiment, the SSD including 4 banks may have data transfer time 100 μs and program time 300 μs for LSB and data transfer time 100 μs and program time 1500 μs for MSB. If the MaxC(t) is determined to be 1.6 ms, 1 page of MSB or 4 pages of LSB in each bank may be selected as the selected cache line, transferred and programmed.

After step S3000, execution timing of a NPJ corresponding to the selected victim cache line is scheduled in step S4000. According to a NPJ scheduling operation of an example embodiment of the inventive concept, a next NPJ may be scheduled to be performed once channels are in idle state (i.e. data does not exist on the channels) although a previous NPJ performed is not finished in all channels.

Data of one super-page may be supplied from one cache line of the buffer memory 200 when a NPJ is performed. In an exemplary embodiment, a super-page may be defined as the number of channels times IO unit of flash memory. For example, in case that the main storage 300 supports 8 channels, to each of which 4 kb MLC NAND flash memory is coupled, the size of data (i.e. super-page) to be programmed to the main storage 300 through one program operation may be 32 kb. In case that the NAND flash memory can support 2 planes, the size of data (i.e. super-page) to be programmed to the main storage 300 through one program operation will be 64 kb. However, the size of data to be programmed to the main storage 300 through one program operation is not limited to the size of super-page or a specific size of page but may be changeable to be various sizes.

Data of the selected victim cache line in step S5000 is programmed to corresponding flash memories according to the result of scheduling in step S4000. Program operation performed in step S5000 is executed in flash memories that are included in different channels from one another and that may be included in same ways.

Figure 8:
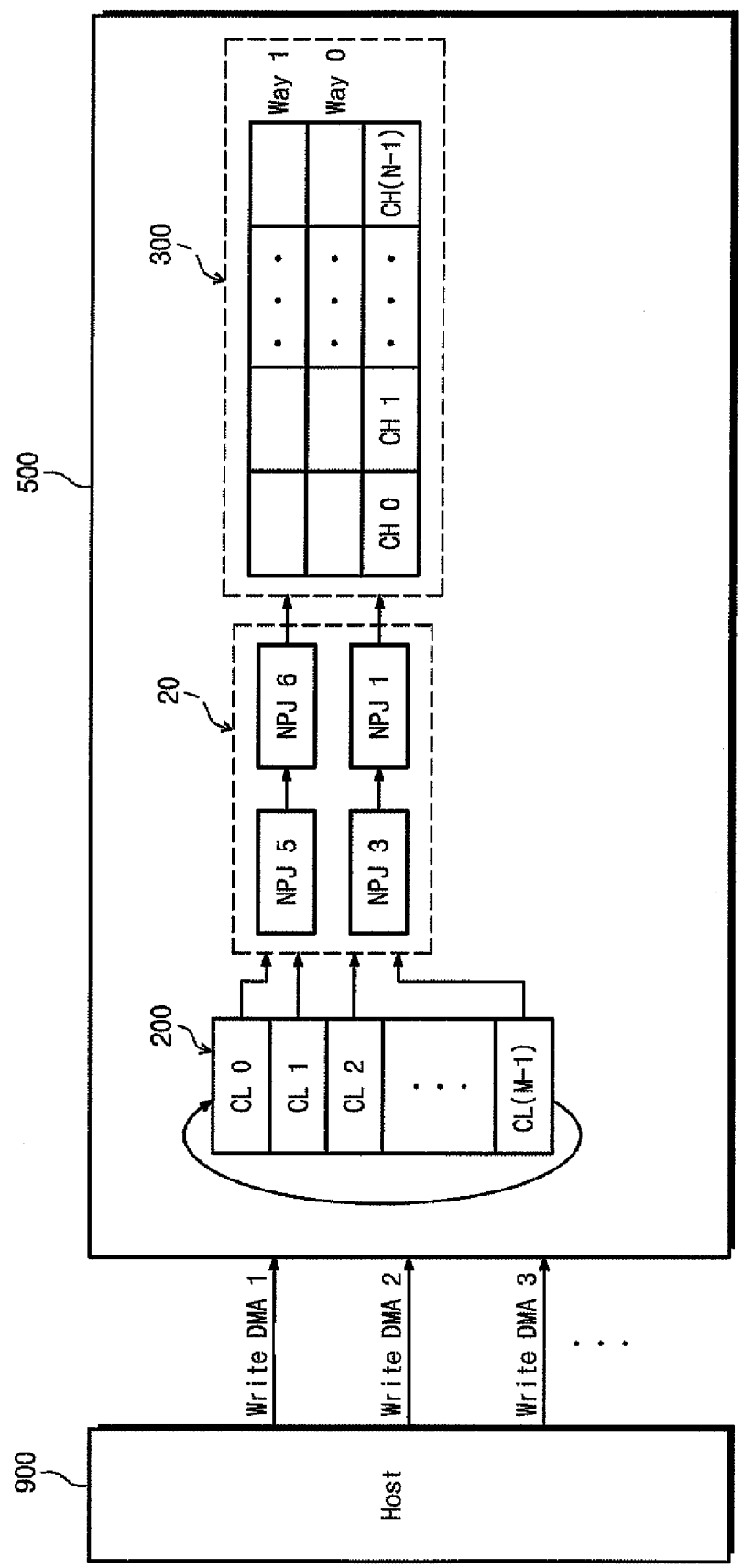
FIG. 8 through FIG. 11 show a method of programming data of a selected victim cache line into a corresponding flash memory device.

FIG. 8 to FIG. 11 illustrate a method for programming data of a selected victim cache line to corresponding flash memories according to an example of the inventive concept. The selected cache line in the SSD 500 and program method thereof according to the inventive concept is shown in FIG. 8.

Referring to FIG. 8, the buffer memory 200 may have the same physical structure as shown in FIG. 4 and manage data by units of cache line. One cache line may include a plurality of sectors and can store data of pages (e.g. N pages) to be programmed through the plurality of channels (e.g. N channels) of the main storage 300. In this exemplary embodiment, NPJ0 denotes program operation for data stored in the cache line CL0, and NPJ1 denotes program operation for data stored in the cache line CL1. Also, NPJ(M−1) denotes program operation for data stored in the cache line CL(M−1). One NPJ can be performed at one way in each of N channels of the main storage 300.

In FIG. 8, it is exemplified that CL1, CL3, CL5 and CL6 are selected as victim cache lines. Each program operation for data stored in CL1, CL3, CL5 and CL6 may correspond to NPJ1, NPJ3, NPJ5 and NPJ6 respectively. The victim cache line may be selected by control of the data cache layer DCL 20 in the SSD controller 100. The data cache layer DCL 20 can schedule execution time of a NPJ to program data of the selected victim cache line into corresponding flash memories.

Figure 9:
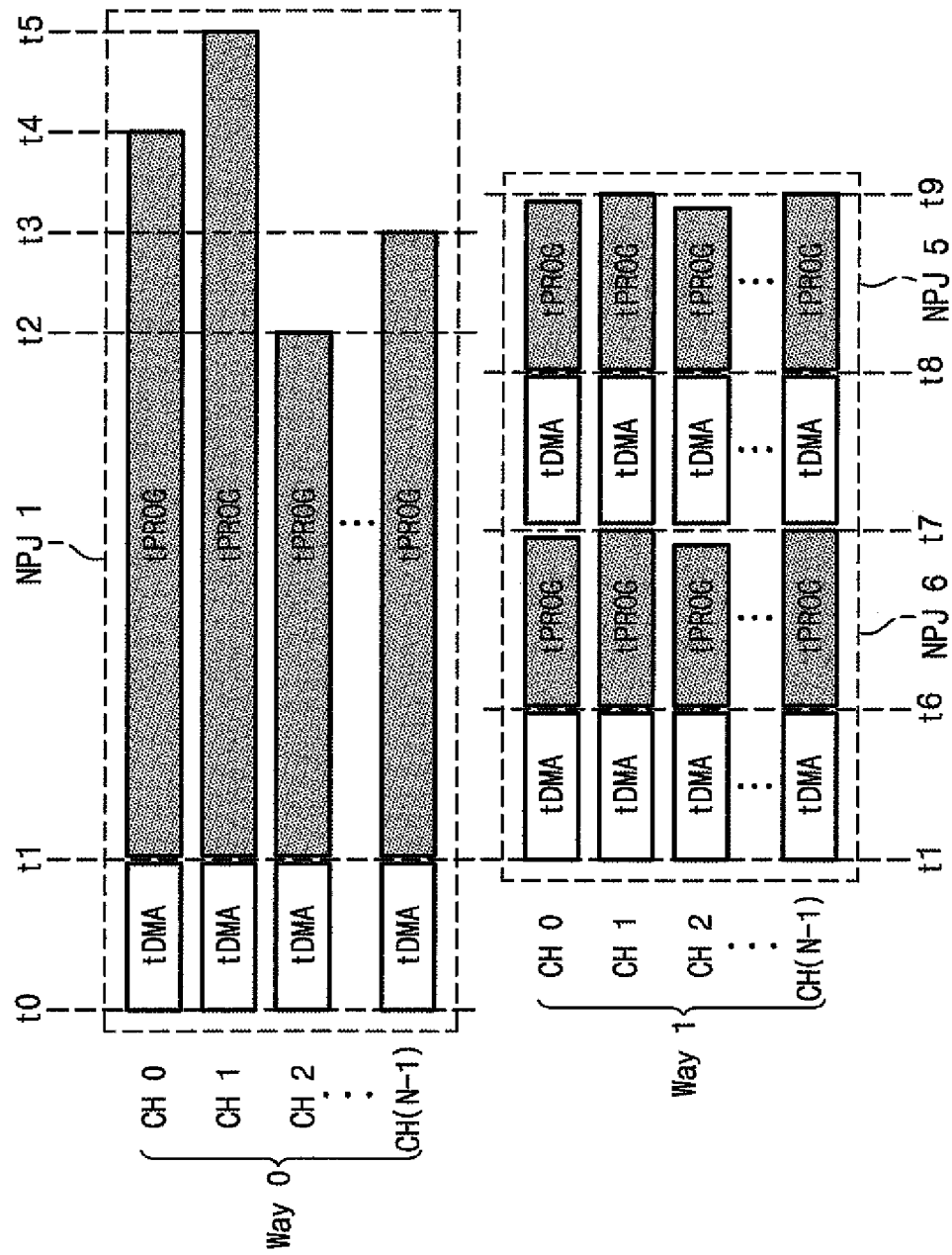

FIG. 9 shows the result of scheduling NPJs according to an example embodiment of the inventive concept. The result of scheduling NPJs by unit of cache line is shown in FIG. 9. Referring to FIG. 8 and FIG. 9, a NPJ can be divided into a tDMA period and a tPROG period. During tDMA, data of the victim cache line can be transferred to corresponding flash memories through the channels. A tDMA period can be varied by the number of channels available for data transfer. Also, during a tDMA period, data transferred to flash memories can be stored into a page buffer (not shown) included in each of flash memories. The page buffer may operate as a sense amplifier for sensing data programmed into a flash memory cell during a read operation and as a write driver for writing data stored in the page buffer to a flash memory cell during a write operation.

During a tPROG period, each flash memory can be programmed using the program voltage generated by the way of ISPP (incremental step pulse programming). The program voltage level can be gradually increased by a certain incremental ΔV according to the repetition of a program loop. The number of repetitions of a program loop may be determined by the result of a program verify operation which can be varied by the characteristics of a flash memory cell. For example, in case that the life span of a flash memory cell is left short or the degree of wear is too big, the number of program fails will be increased. Thus, the number of repetition of a program loop and program time tPROG is increased as a flash memory cell is used.

A tPROG period may be set different per NPJ according to a program type of a flash memory, such as a LSB program or a MSB program. For example, a tPROG period of a MSB program may be set longer than that of a LSB program. Also, a tPROG period may be changeable by the life span or the degree of wear of flash memory, which has close relation with the stress applied to the flash memory. The main reason of the stress applied to flash memory may include the number of erase operations and program operations. If the life span of flash memory is left short or the degree of wear is big, the number of repetition of a program loop is increased, so that a tPROG period will be increased. Features of a tPROG period like this may be varied per each flash memory of the main storage 300.

As shown in FIG. 8 and FIG. 9, NPJ1 among many NPJs (i.e. NPJ1, NPJ3, NPJ5 and NPJ6) is scheduled to be performed first. When NPJ1 is performed, data stored in the CL1 of the buffer memory 200 is programmed into N number of flash memories (311, 321, - - - 331) corresponding to Way0 in N number channels CH0~CH(N-1) of the main storage 300. In performing NPJ1, a tDMA period for N number channels may be the same for one another while a tPROG period may be different per each channel. For example, a tPROG period of the flash memory corresponding to Way0 of CH2 is the time from t1 to t2, a tPROG period of the flash memory corresponding to Way0 of CH(N-1) is the time from t1 to t3, a tPROG period of the flash memory corresponding to Way0 of CH0 is the time from t1 to t4, and a tPROG period of the flash memory corresponding to Way0 of CH1 is the time from t1 to t5. In FIG. 8, the fastest program finish time among flash memories of N number channels where NPJ1 is performed is t2, and the latest program finish time among flash memories of N number channels where NPJ1 is performed is t5.

According to the scheduling method of an example embodiment of the inventive concept, a new NPJ (e.g. NPJ6) can be performed without waiting until the previously performed NPJ1 is finished in all channels. Thus, in an example embodiment of the inventive concept, once a tDMA period of NPJ1 is passed, a different NPJ (e.g,. NPJ6) can be scheduled to be performed in flash memories in a way (e.g,. Way1) different than the way (e.g,. Way0) in which the NPJ1 is performed. For this, data transfer to N number flash memories for NPJ6 can be executed through N number channels at the same time or in parallel from t1 to t6 during tDMA.

In a case that program operation of a MSB page is performed in NPJ1 and program operation of a LSB page is performed in NPJ6, it may be that NPJ1 is not finished after NPJ6 is done. In this case, during tPROG period of NPJ1, NPJ5 can be further performed in flash memories (e.g,. 312, 322, - - - , 332) in a way (e.g., Way1) different than Way0. As a result, while one NPJ (NPJ1) is performed in Way0, two NPJs (NPJ6, NPJ5) can be performed successively in Way1. Accordingly, at least a portion of a tPROG period of NPJ1 (e.g,. from t2 to t5) can be overlapped by a tDMA and/or a tPROG of NPJ6 and/or NPJ5.

According to the scheduling method of an example embodiment of the inventive concept as thus described, waiting time that is required for performing a plurality of NPJs is decreased and the usage of channels of the main storage 300 and the program speed is improved. Also, the re-usage of the buffer memory 200 that supplies data to be programmed to the main storage 300 is improved. Accordingly, data provided from the host 900 can be stored into the buffer memory 200 without any bottleneck and performance fluctuations due to bank collision of the main storage 300 can be minimized.

A performing method of the plurality of NPJs through the Way0 and Way1 is explained above as an example. However, the number of ways that are used for performing the plurality of NPJs is not limited a specific number but changeable variously.

Figure 10:
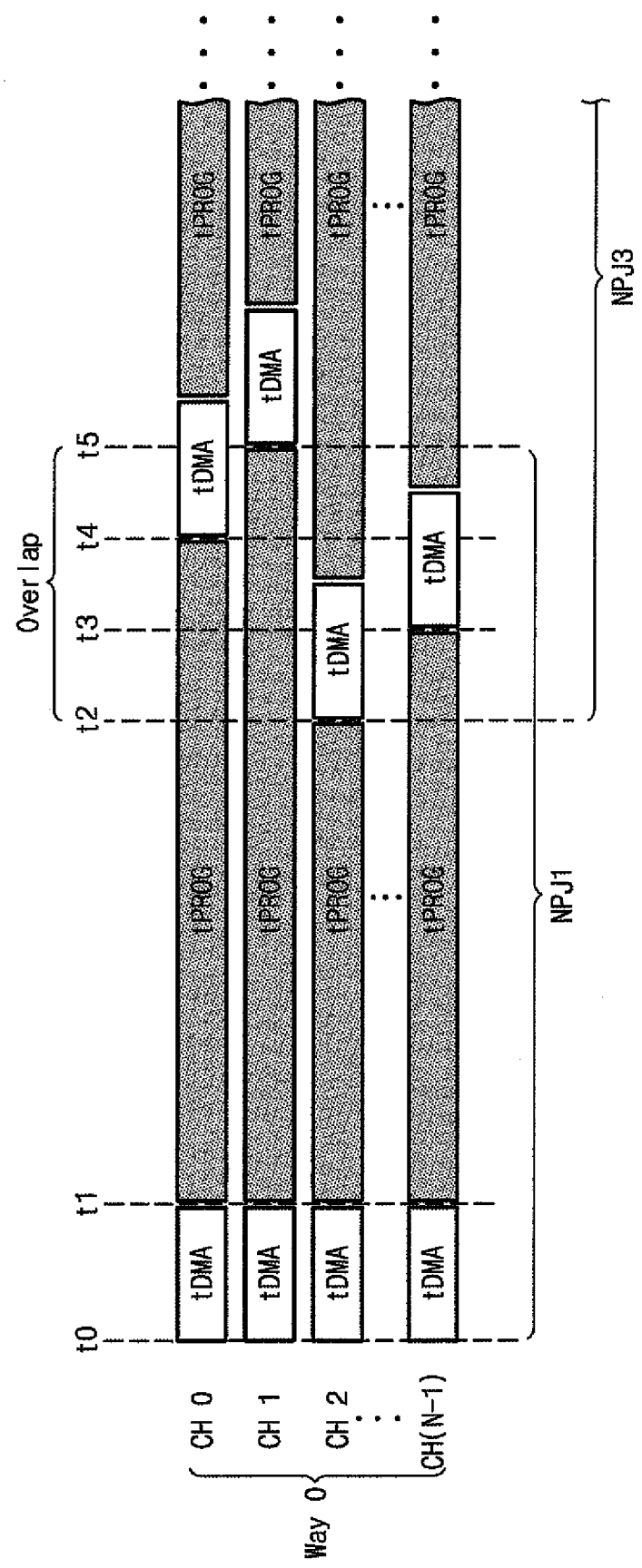

FIG. 10 shows the result of scheduling NPJs according to another example embodiment of the inventive concept. The result of scheduling NPJs by units of cache line is shown in FIG. 10.

Referring to FIG. 10, it is noticed in performing NPJ1 that a tPROG period of a program performed in each of N number channels is different one another. For example, a tPROG period of Way0 in CH2 ends at t2, and a tPROG period of Way0 in CH1 ends at t5. In this exemplary embodiment, to avoid time waste in each channel included in the same way, scheduling each channel where program operation is finished can be executed by the unit of a page. As a result, a portion of a tPROG period of two NPJs (NPJ1, NPJ3) to be preformed successively in a same way can be overlapped. In this case, starting time of a tDMA period and a tPROG period for each channel included in a same way are different from one another. Accordingly, as each NPJ can be scheduled by the unit of page, time waste until NPJ3 is performed after NPJ1 is performed does not occur, so that the usage of channels can be improved considerably.

Figure 11:
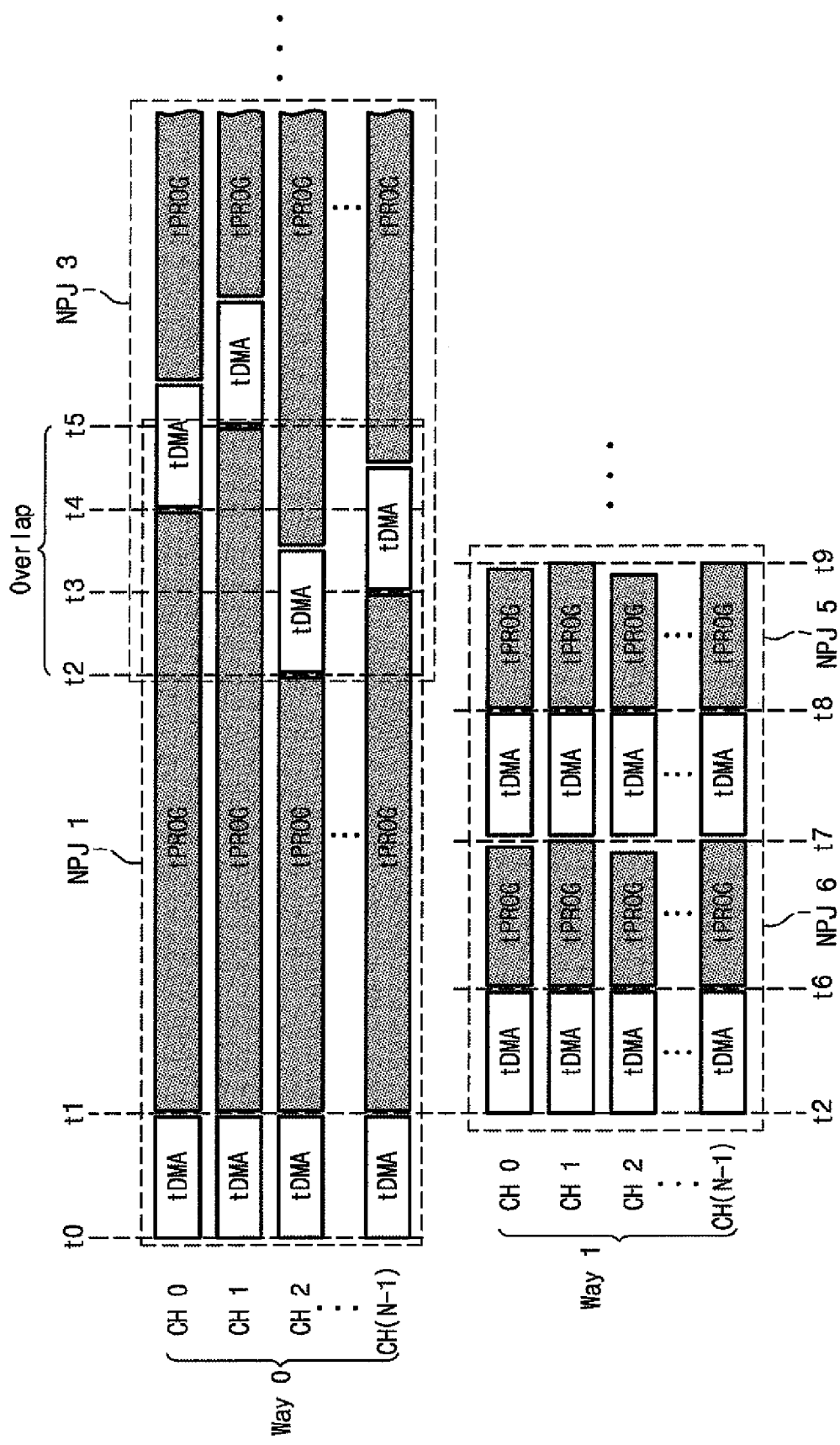

FIG. 11 shows the result of scheduling NPJs according to still another example embodiment of the inventive concept. The result of scheduling NPJs by the unit of cache line and the unit of page is shown in FIG. 11.

A page replacement method and a scheduling method in accordance with one example of the inventive concept can be executed by the unit of page as well as by the unit of cache line. Also, a page replacement method and a scheduling method in accordance with the another example embodiment as shown in FIG. 11, can be executed by both the unit of cache line and the unit of page. Thus, FIG. 11 is very similar and mixes features of FIG. 9 and FIG. 10, so that detailed explanation about FIG. 11 is omitted.

According to the scheduling method of exemplary embodiments of the inventive concept as explained above, as the scheduling method using both the unit of cache line and the unit of page is possible, re-usage of the buffer memory 200 and usage of channels can be maximized, so that time waste of program operation can be minimized.

Figure 12:
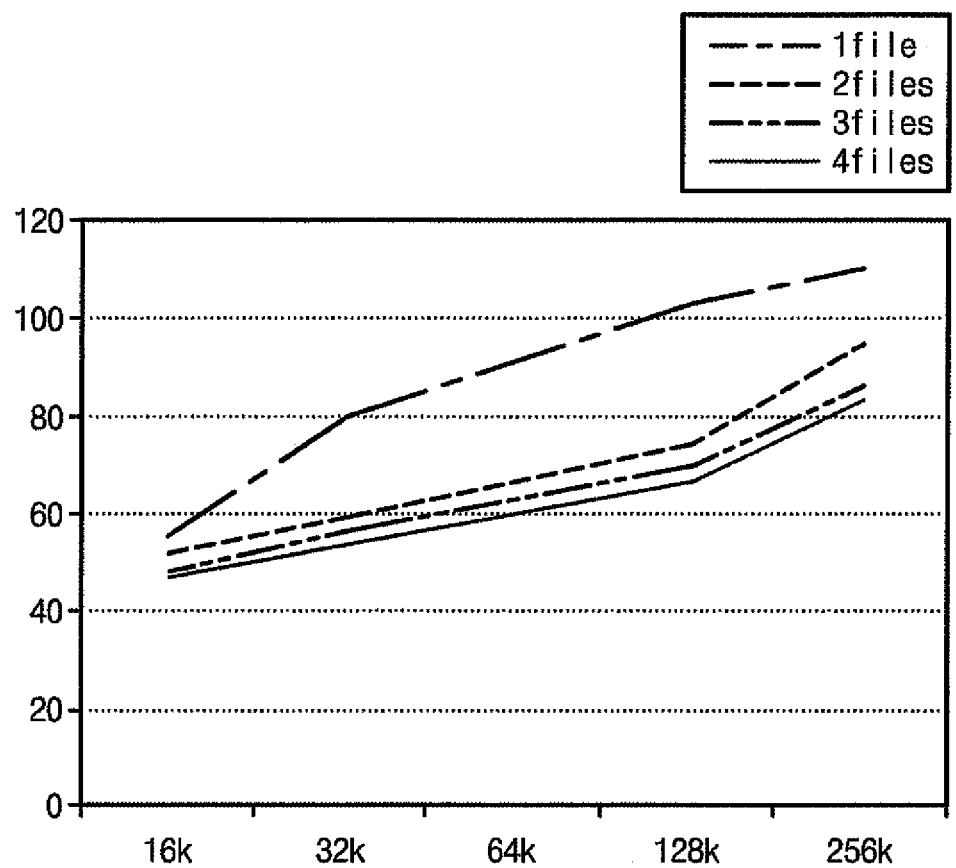
FIG. 12 is a graph showing a multi-file storage performance of a buffer memory that does not adopt a page replacement technique and a scheduling method according to an example embodiment of the inventive concept.
Figure 13:
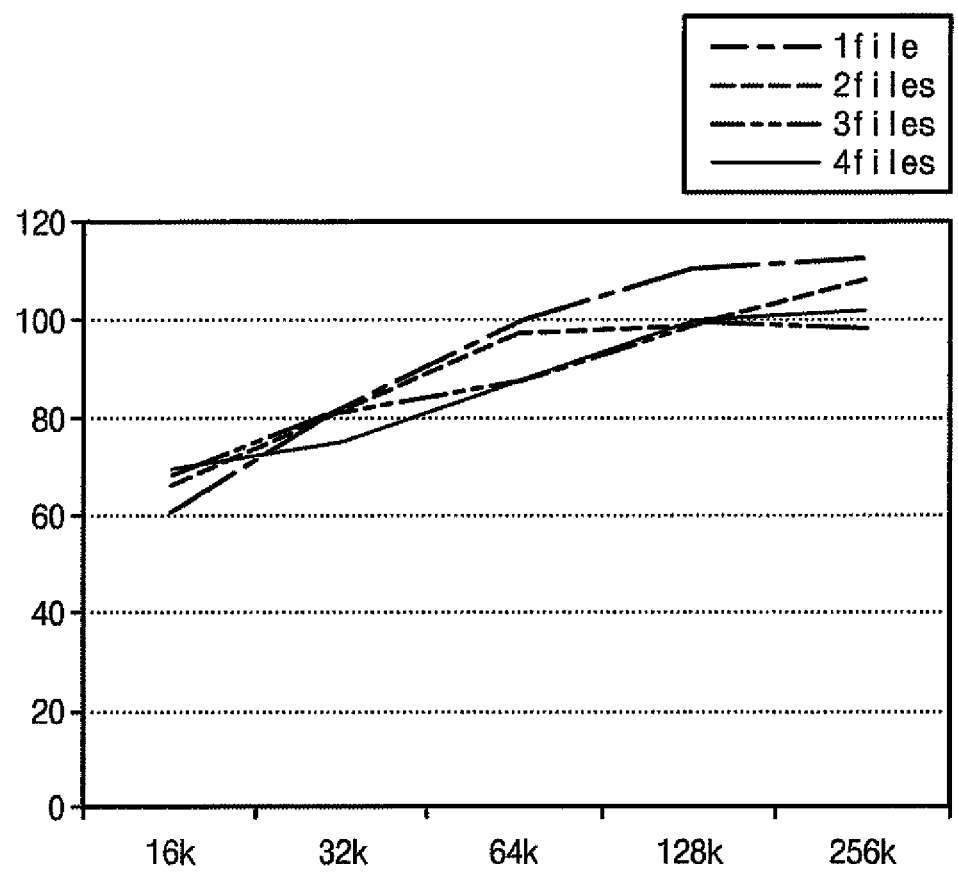
FIG. 13 a exemplary graph showing a multi-file storage performance of a buffer memory adopting a cost based page replacement technique and a scheduling method according to an example embodiment of the inventive concept.

FIG. 12 is a graph showing a multi-file writing performance of the SSD 500 when the page replacement method and the scheduling method according to the example embodiments of the inventive concept are not applied. FIG. 13 is a graph showing a multi-file writing performance of the SSD 500 when the page replacement method and the scheduling method according to exemplary embodiments of the inventive concept are applied.

Multi-file writing performance indicates the writing performance of the SSD 500 when a plurality of files is stored successively into the buffer memory 200. In FIG. 12, multi-file writing performance of the SSD 500 including 128M DRAM as the buffer memory 200 in case of applying a LRU-based page replacement method is exemplified. In FIG. 13, under the same condition as FIG. 12, multi-file writing performance of the SSD 500 in case of applying the cost-based page replacement according to example embodiments of the inventive concept is shown.

First, referring to FIG. 12, when more than two files are stored into the buffer memory 200, it is noticed that writing performance of the SSD 500 is decreased as the number of files to be stored successively is increased. Discontinuous write operations of the buffer memory 200, due to multiple processes or threads of the CPU 110 in the SSD 500, may decrease the writing performance as the number of files to be stored successively is increased.

Meanwhile, as shown in FIG. 13, according to the data storage method adapting the cost-based page replacement according to the inventive concept, when more than two files are stored into the buffer memory 200, the writing performance of the SSD 500 is similar to that of when one file is stored. That is, the writing performance of the SSD 500 is irrelevant to the number of files to be stored successively. As the number of files to be stored successively is increased and the size of data transfer is increased, the writing performance is shown as tending to slightly decrease. But, this may be caused by the size of the buffer memory 200. According to the data storage method in accordance with the inventive concept, the phenomenon of abruptly decreased writing performance as that shown in FIG. 12 is avoided.

Figure 14:
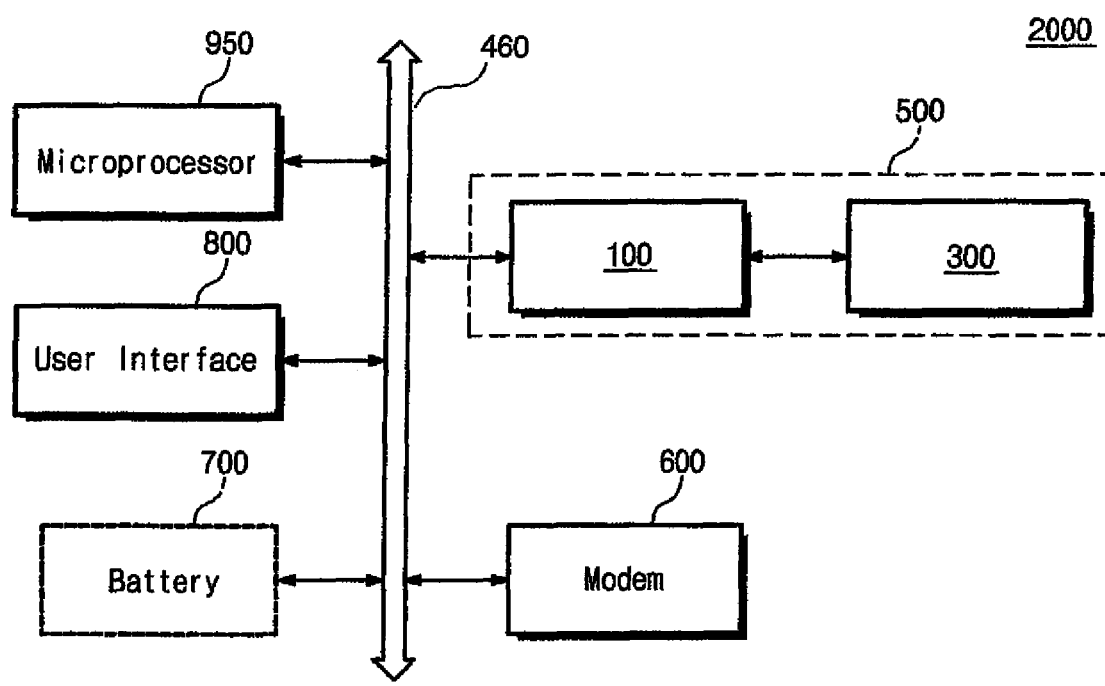
FIG. 14 is a block diagram showing a computing system in accordance with an example embodiment of the inventive concept.

FIG. 14 shows a computing system according to an example embodiment of the inventive concept. Referring to FIG. 14, the computing system 2000 includes the data storage device 500, a modem 600, a user interface 800 and a microprocessor 950, all of which are connected to a system bus 460. The modem 600 may include a baseband chipset and a baseband SoC.

If the computing system 2000 in accordance with the example embodiment of the inventive concept is a mobile device, a battery 700 for providing an operating voltage for the computing system 2000 may be included in the computing system 2000. Though not shown in FIG. 14, it will be apparent to those skilled in the art that the computing system 2000 may further include an application chipset, a camera image processor CIS, a mobile DRAM or the like.

The data storage device 500 including a controller 100 and the main storage 300 has substantially the same construction of the SSD as shown in FIG. 1, FIG. 2, and FIG. 8. However, the data storage device 500 may be constructed by various types. For example, the data storage device 500 may be constructed by a memory card and/or a memory card system.

The controller 100 is electrically coupled to the microprocessor 950 and the main storage 300 and it can access the main storage 300 in response to a request from the microprocessor 950. For example, the controller 100 is configured to control read/write/erase operations for the main storage 300 and to provide an interface between the microprocessor 950 and the main storage 300. Also, the controller 100 is configured to execute firmware to control the main storage 300.

The controller 100, as shown in FIG. 2, may include an internal memory, a CPU, a host interface, and a memory interface. The controller 100 may further comprise a buffer memory to store data transferred between itself and the main storage 300 and data transferred between it and the microprocessor 950. The buffer memory can be inside or outside the controller 100. The buffer memory and the internal memory may be constructed by random accessible memory like DRAM or SRAM. The buffer memory and/or the internal memory may be used as an operating memory of the CPU that controls overall operations of the controller 100.

The host interface supplies a protocol to exchange data between the microprocessor 950 and the controller 100. For example, the controller 100 is constructed to interface with the microprocessor 950 or an external through one of various interface protocols such as USB (Universal Serial Bus), MMC (Multi Media Card), PCI-E (PCI Express), ATA (AT Attachment), SATA (Serial AT Attachment), PATA (Parallel AT Attachment), SCSI (Small Computer System Interface), SAS (Serial Attached SCSI), ESD (Enhanced Small Disk Interface), and IDE (Integrated Drive Electronics). The memory interface supplies an interface between the controller 100 and the main storage 300.

The main storage 300 can be used as a main storage device to store large amounts of data in the data storage device 500. The main storage 300 can store N-bit data (N is 1 or more integer) executed/to be executed by the microprocessor 950 through the controller 100. The main storage 300 may include nonvolatile memories that can support a plurality of channels and a plurality of ways. In one exemplary embodiment, the nonvolatile memories can be flash memories. Each of the flash memories include a memory cell array to store data, a read/write circuit to read/write data to the memory cell array, an address decoder to decode addresses from an external and send the decoded address to the read/write circuit, and a control logic to control overall operations of the each flash memory.

In one exemplary embodiment, the flash memory cell can use one of various cell structures having a charge storage layer. The cell structure having a charge storage layer may include one of a charge trap flash structure, a stack flash structure having multi stacked cell array, a flash structure with no source and drain, and a pin-type flash structure. Also, the read/write circuit includes a page buffer circuit having a plurality of page buffers.

Though not shown in FIG. 14, the data storage device 500 may further comprise an error correction block that detects error of data read from the main storage 300 and corrects the error. The error correction block may be included in the controller 100 or in the main storage 300.

The controller 100 and the main storage 300 may be integrated in a single semiconductor device. In an exemplary embodiment, the single semiconductor device having the controller 100 and the main storage 300 can constitute a memory card, such as a PCMCIA (personal computer memory card international association) card, a CF (compact flash) card, a SMC, a memory stick, a MMC, a SD card, and a universal flash card. In another exemplary embodiment, as shown in FIG. 1, FIG. 2 and FIG. 8, the single semiconductor having the controller 100 and the main storage 300 can constitute a SSD (Solid State Drive). A data cache layer 20 that selects a victim cache line of the buffer memory 200 and schedules execution timing of NPJ for programming data of the victim cache line to flash memories can be loaded as software and firmware in the controller 100 of SSD.

As an another example, the data storage device 500 can be applicable to one of various electronic devices, such as a computer, a portable computer, an Ultra mobile PC, a workstation, a net-book, a PDA, a web tablet, a wireless phone, a mobile phone, a smart phone, a digital camera, a digital audio recorder, a digital picture player, a digital video recorder, a digital video player, a wireless transmitter-receiver, and a home network device. Also, the data storage device 500 can be applicable to one of various devices comprising a computer network and to one of various devices comprising a telematix network. In addition, the data storage device 500 can apply to a RFID device or one of various elements comprising a computing system (e.g. a SSD, a memory card).

The main storage 300 and/or the data storage device 500 may be mounted in various packages, such as, Package on Package (PoP), Ball Grid Array (BGA), Chip Scale Package (CSPs), Plastic Leaded Chip Carrier (PLCC), Plastic Dual In-Line Package (PDIP), Die in Waffle Pack, Die in Wafer Form, Chip on Board (COB), Ceramic Dual In-Line Package (CERDIP), Plastic Metric Quad Flat Pack (MQFP), Thin Quad Flat Package (TQFP), Small Outline IC (SOIC), Shrink Small Outline Package (SSOP), Thin Small Outline Package (TSOP), Thin Quad Flat Package (TQFP), System In Package (SIP), Multi Chip Package (MCP), Wafer-level Fabricated Package (WFP), and Wafer-level Processed Stack Package (WSP).

While example embodiments have been disclosed herein, it should be understood that other variations may be possible. Such variations are not to be regarded as a departure from the spirit and scope of example embodiments of the inventive concept, and all such modifications as would be obvious to one skilled in the art are intended to be included within the scope of the following claims.

What is claimed is:

1. A data storage device comprising:
a plurality of first main memories coupled to a plurality of channels;
a plurality of second main memories coupled to the plurality of channels;
a buffer memory configured to store data to be programmed to the first and the second main memories, wherein the data to be programmed comprises victim cache lines data including at least one of first victim cache line data, second victim cache line data, third victim cache line data, and fourth victim cache line data; and
a controller configured to:
set a threshold value in consideration of at least two factors including; a size of the buffer memory, a number of the plurality of channels, a Direct Memory Access (DMA) time, a program type for the first main memory, a program type for the second main memory, a program time for the first main memory, a program time for the second main memory, a number of banks in the first main memory, and a number of banks in the second main memory,
determine whether buffer memory usage exceeds the threshold value, and upon determining that buffer memory usage exceeds the threshold value, determine a maximum cost for each one of the victim cache lines data,
select the first victim cache line data from the victim cache lines data based on the maximum cost, and
program the victim cache lines data to the second main memories while programming the first victim cache line data to the first main memories.

2. The data storage device of claim 1, wherein the first main memories and the second main memories correspond to respective different ways.

3. The data storage device of claim 1, wherein the controller is further configured to:
transfer the first victim cache line data to the first main memories via the plurality of channels,
transfer the victim cache lines data to the second main memories via the plurality of channels, and
after transferring of the first victim cache line data to the first main memories, transfer the second victim cache line data to the second main memories and program the second victim cache line data to the second maim memories.

4. The data storage device of claim 3, wherein the controller is further configured to:
after the second victim cache line data is programmed to the second main memories, determine whether the first victim line data has been programmed to the first main memories, and
upon determining that the first victim cache line data has not been programmed to the first main memories, transfer the third cache line data to the second main memories via the plurality of channels.

5. The data storage device of claim 3, wherein the controller is further configured to transfer in page units the fourth victim cache line data to at least one of the first main memories upon determining that programming of the first victim cache line data to the at least one of the first main memories is finished.

6. The data storage device of claim 5, wherein the controller is further configured to transfer the fourth victim line data to the at least one of the first main memories during the programming of the first victim cache line data to at least another one of the first main memories.

7. The data storage device of claim 1, wherein the maximum cost comprises a sum of a transfer cost and a program cost for each one of the victim cache lines data.

8. The data storage device of claim 1, wherein the buffer memory includes a plurality of cache lines, each of which includes data of a plurality of pages to be programmed through the plurality of channels.

9. The data storage device of claim 1, wherein the buffer memory manages data by unit of cache line.

10. A method of programming data in data storage device including first main memories and second main memories coupled to a buffer memory via a plurality of channels, the method comprising:
temporarily storing data in the buffer memory according to a number of victim cache lines to define victim cache lines data including at least one of first victim cache line data, second victim cache line data, third victim cache line data, and fourth victim cache line data;
setting a threshold value in consideration of at least two factors including; a size of the buffer memory, a number of the plurality of channels, a Direct Memory Access (DMA) time, a program type for the first main memory, a program type for the second main memory, a program time for the first main memory, a program time for the second main memory, a number of banks in the first main memory, and a number of banks in the second main memory;
determining whether buffer memory usage exceeds the threshold value;
upon determining that buffer memory usage exceeds the threshold value, determining a maximum cost for each one of the victim cache lines data;
selecting the first victim cache line data from the victim cache lines data based on the maximum cost, and
programming at least a portion of the victim cache lines data in the second main memories while also programming at least a portion of the first victim cache line data to the first main memories.

11. The method of claim 10, further comprising:
transferring the first victim cache line data to the first main memories via the plurality of channels;
transferring the victim cache lines data to the second main memories via the plurality of channels; and
after transferring of the first victim cache line data to the first main memories, transferring the second victim cache line data to the second main memories and then programming the second victim cache line data to the second maim memories.

12. The method of claim 11, further comprising:
after programming the second victim cache line data to the second main memories, determining whether the first victim line data has been completely programmed to the first main memories; and
upon determining that the first victim cache line data has not been completely programmed to the first main memories, transferring the-third cache line data to the second main memories via the plurality of channels.

13. The method of claim 11, further comprising:
transferring in page units the fourth victim cache line data to at least one of the first main memories upon determining that programming of the first victim cache line data to the at least one of the first main memories is not complete.

14. The method of claim 13, further comprising:
transferring the fourth victim line data to the at least one of the first main memories during the programming of the first victim cache line data to at least another one of the first main memories.

15. The method of claim 10, wherein the maximum cost comprises a sum of a transfer cost and a program cost for each one of the victim cache lines data.

16. The method of claim 10, wherein each one of the victim cache lines data includes a plurality of pages.

17. The method of claim 10, wherein the buffer memory manages the temporarily stored data on a cache line unit basis.

* * * * *